March 3, 1953     W. L. PETTIJOHN     2,630,332

VEHICLE FOR INVALIDS

Filed Oct. 30, 1950

Wesley L. Pettijohn
INVENTOR.

BY
*Attorneys*

Patented Mar. 3, 1953

2,630,332

UNITED STATES PATENT OFFICE 2,630,332

VEHICLE FOR INVALIDS

Wesley L. Pettijohn, St. Joseph, Mo.

Application October 30, 1950, Serial No. 192,899

1 Claim. (Cl. 280—233)

This invention relates to new and useful improvements and structural refinements in vehicles for invalids, and the principal object of the invention is to provide convenient and expeditious transportation for persons who are unable to use either or both legs or arms, and, in instances of temporary ailments, to assist such persons in learning to walk.

The above object is achieved by the provision of a vehicle including a frame provided with a seat and a plurality of travelling wheels, and an important feature of the invention resides in the provision of foot actuated as well as hand actuated means for driving the wheels.

Some of the advantages of the invention reside in its simplicity of construction, in its convenient and expeditious operation, in its pleasing appearance, and in its adaptability to economical manufacture.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
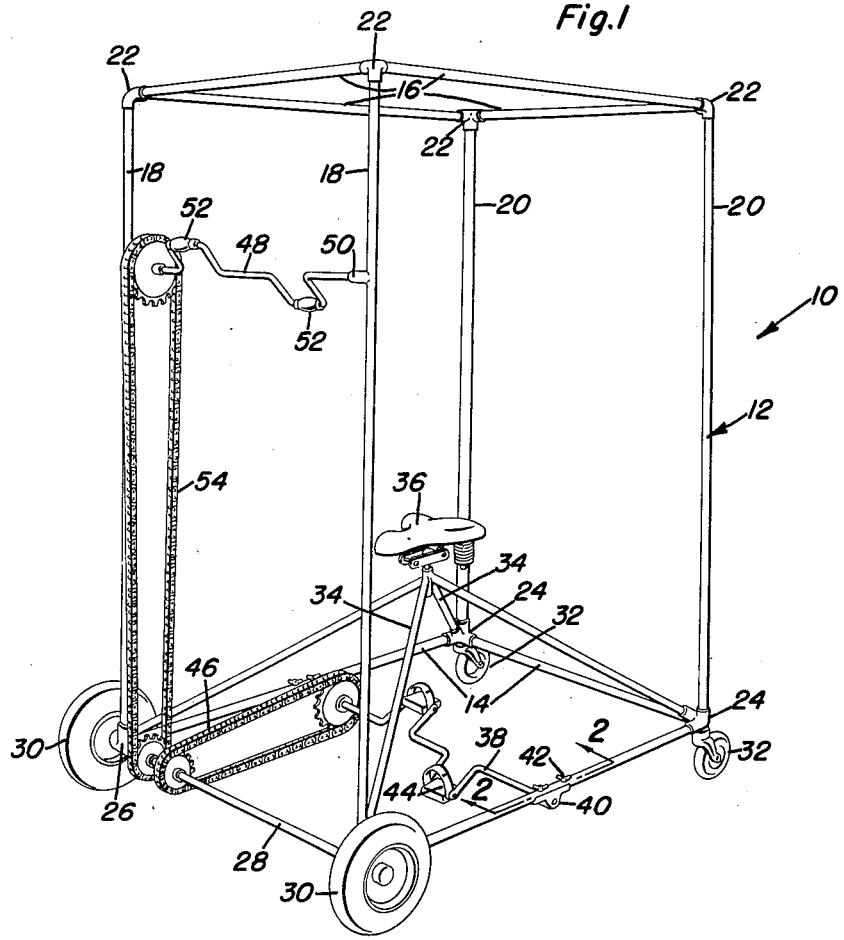
Figure 1 is a perspective view of the invention.
Figure 2:
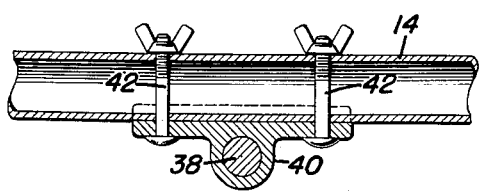
Figure 2 is a fragmentary sectional view, taken substantially in the plane of the line 2—2 in Figure 1.

Referring now to the accompanying drawings in detail, the invention consists of a vehicle for invalids which is designated generally by the reference character 10 and embodies in its construction a box-shaped frame 12 including a horizontally disposed, U-shaped base member 14, a rectangular top member 16, and front and rear pairs of corner posts 18, 20 respectively, which connect the top member to the base member, as shown.

The entire frame is preferably constructed from tubular material, suitable couplings being employed for connecting the various members and corner posts of the frame together, as exemplified at 22, 24, 26.

The fourth side or front end of the base member 14 is constituted by a transversely extending axle 28 which is rotatably journalled in the couplings 26 at the lower end of the front corner posts 18, and a pair of relatively large travelling wheels 30 are mounted on the axle 28, as shown.

Relatively small swivel casters 32 are attached to the couplings 24 at the lower ends of the rear corner posts 20, the conventional swivel arrangement of the casters facilitating steering.

A set of four upwardly convergent struts 34 extend upwardly and inwardly from the couplings 24, 26, and a seat 36, preferably, a bicycle type seat, is mounted at the upper, convergent ends of the struts 34, so that the seat is disposed substantially centrally within the frame 12.

A transversely extending crankshaft 38 is disposed under the seat 36 and is rotatably journalled in suitable bearings 40 which are secured to the opposite sides of the base member 14 by pairs of screws 42, the crankshaft 38 carrying a pair of foot pedals 44 and being operatively connected to the axle 28 by a chain drive 46.

It will be apparent from the foregoing that by sitting on the seat 36 and actuating the foot pedals 44 with his feet, a physically handicapped person may conveniently and expeditiously propel himself along a floor or ground, and if desired, such person may extend one or both feet to the ground or floor if he is utilizing the invention as a training vehicle in learning to walk.

In addition to the foot propelled driving means, hand propelled driving means are provided, these comprising a second crankshaft 48 which is rotatably mounted in tubular, laterally projecting bearings 50 on the front corner posts 18. The crankshaft 48 is provided with a pair of hand grips 52 and is operatively connected to the axle 28 by a chain drive 54, so that the user may utilize either or both, his hands and feet, in effecting his transportation.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A vehicle for invalids, comprising a box-shaped frame including a base member, a top member and front and rear pairs of corner posts connecting the base and top members together, a pair of bearings provided at the lower ends of said front corner posts, a transverse axle rotatably journalled in said bearings, a pair of traveling wheels mounted on said axle, casters provided at the rear of said base member, a set of upwardly convergent struts secured at their lower ends to lower end portions of said corner posts and extending upwardly in said frame, a seat provided at the upper ends of said struts, and means on said frame adapted to be actuated by an occupant of said seat for rotating said axle said means comprising a crankshaft extending transversely of and rotatably journalled in said base member under said seat, a pair of foot pedals provided on the throws of said crankshaft, and an operative connection between said crankshaft and said axle.

WESLEY L. PETTIJOHN.

REFERENCES CITED

The following references are of record in the file of this patent:

UNITED STATES PATENTS

| Number | Name | Date |
|---|---|---|
| 409,581 | Harrell | Aug. 20, 1889 |
| 551,814 | East | Dec. 24, 1895 |
| 600,471 | Yingst | Mar. 8, 1898 |
| 1,307,058 | McGrath | June 17, 1919 |

FOREIGN PATENTS

| Number | Country | Date |
|---|---|---|
| 626,568 | Great Britain | July 18, 1949 |